United States Patent
Adachi et al.

(10) Patent No.: US 10,079,110 B2
(45) Date of Patent: Sep. 18, 2018

(54) CAPACITOR DEVICE AND COMPOSITE ELECTRONIC COMPONENT INCLUDING THE SAME

(71) Applicant: Murata Manufacturing Co., Ltd., Nagaokakyo-shi, Kyoto-fu (JP)

(72) Inventors: Hirobumi Adachi, Nagaokakyo (JP); Hitoaki Kimura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 146 days.

(21) Appl. No.: 15/084,840

(22) Filed: Mar. 30, 2016

(65) Prior Publication Data

US 2016/0293335 A1   Oct. 6, 2016

(30) Foreign Application Priority Data

Apr. 1, 2015   (JP) .................................. 2015-074910
Jan. 15, 2016  (JP) .................................. 2016-006008

(51) Int. Cl.
*H01G 4/30*   (2006.01)
*H01G 4/40*   (2006.01)

(52) U.S. Cl.
CPC ............... *H01G 4/40* (2013.01); *H01G 4/30* (2013.01)

(58) Field of Classification Search
CPC .......... H01G 4/30; H01G 4/005; H01G 4/012; H01G 4/12; H01G 4/232; H01G 4/282
See application file for complete search history.

(56) References Cited

U.S. PATENT DOCUMENTS

| | | | |
|---|---|---|---|
| 2009/0059469 A1 | 3/2009 | Lee et al. | |
| 2009/0139757 A1* | 6/2009 | Lee | H01G 4/005 174/260 |
| 2009/0161288 A1* | 6/2009 | Togashi | H01G 4/005 361/303 |
| 2012/0019982 A1* | 1/2012 | Sasaki | H01G 4/002 361/321.1 |
| 2012/0134067 A1* | 5/2012 | Si | H01G 4/012 361/321.2 |
| 2013/0155574 A1 | 6/2013 | Park et al. | |
| 2015/0014036 A1* | 1/2015 | Park | H01G 4/30 174/260 |

(Continued)

FOREIGN PATENT DOCUMENTS

| | | |
|---|---|---|
| JP | 06-283301 A | 10/1994 |
| JP | 2001-338838 A | 12/2001 |
| JP | 2013-128092 A | 6/2013 |

(Continued)

OTHER PUBLICATIONS

Official Communication issued in Korean Patent Application No. 10-2016-0037689, dated Apr. 14, 2017.

*Primary Examiner* — Nguyen Ha
(74) *Attorney, Agent, or Firm* — Keating & Bennett, LLP

(57) ABSTRACT

A composite electronic component includes a capacitor device and a resistance device which is disposed on the capacitor device and includes a resistor. The capacitor device includes a capacitor body and a first external electrode, a second external electrode, a third external electrode, and a fourth external electrode each provided on a surface of the capacitor body. The resistor is electrically connected to each of the third external electrode and the fourth external electrode.

10 Claims, 13 Drawing Sheets

(56) References Cited

U.S. PATENT DOCUMENTS

| | | | |
|---|---|---|---|
| 2015/0325370 A1* | 11/2015 | Lee | H01G 4/008 361/275.3 |
| 2016/0027582 A1* | 1/2016 | Ahn | H01G 4/30 174/260 |

FOREIGN PATENT DOCUMENTS

| KR | 10-2007-0081538 A | 8/2007 |
|---|---|---|
| KR | 10-2009-0022878 A | 3/2009 |

\* cited by examiner

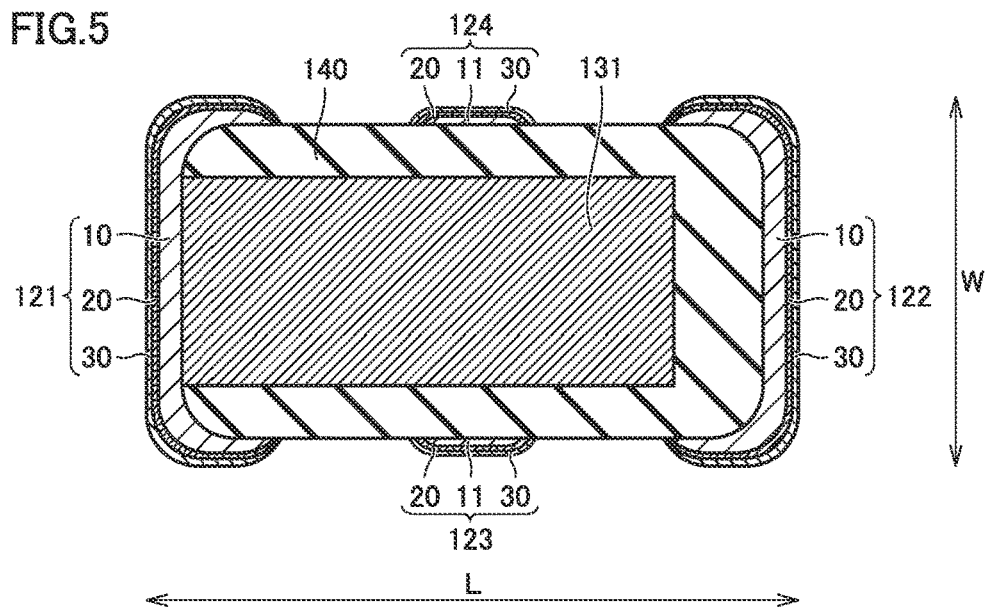
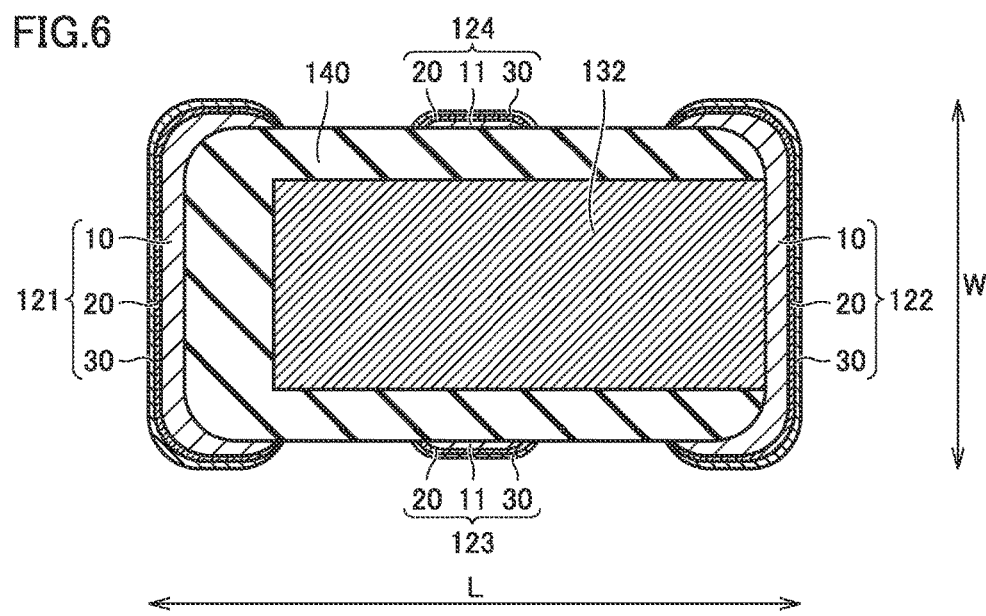

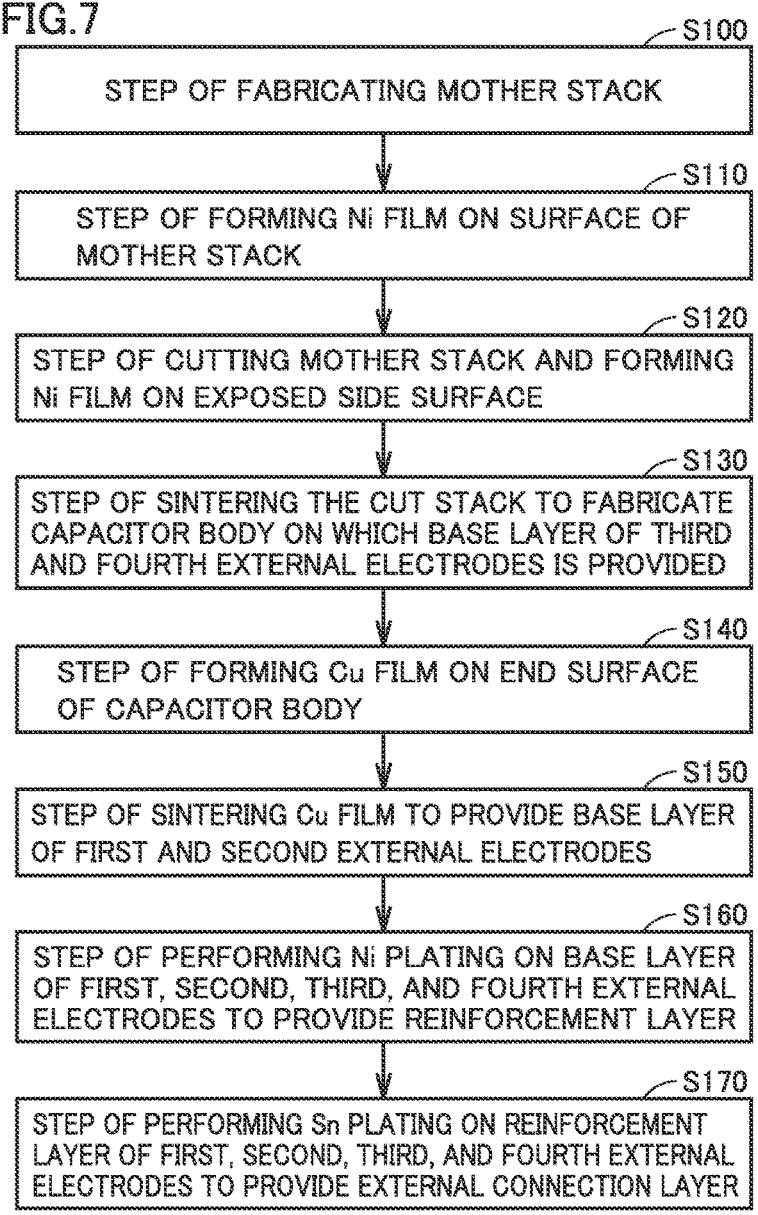
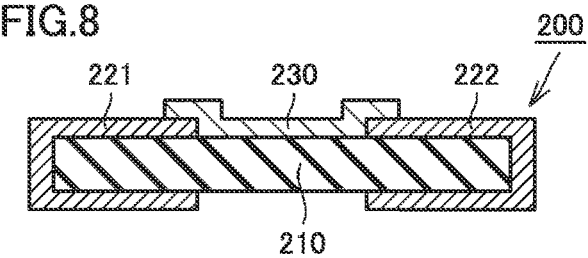

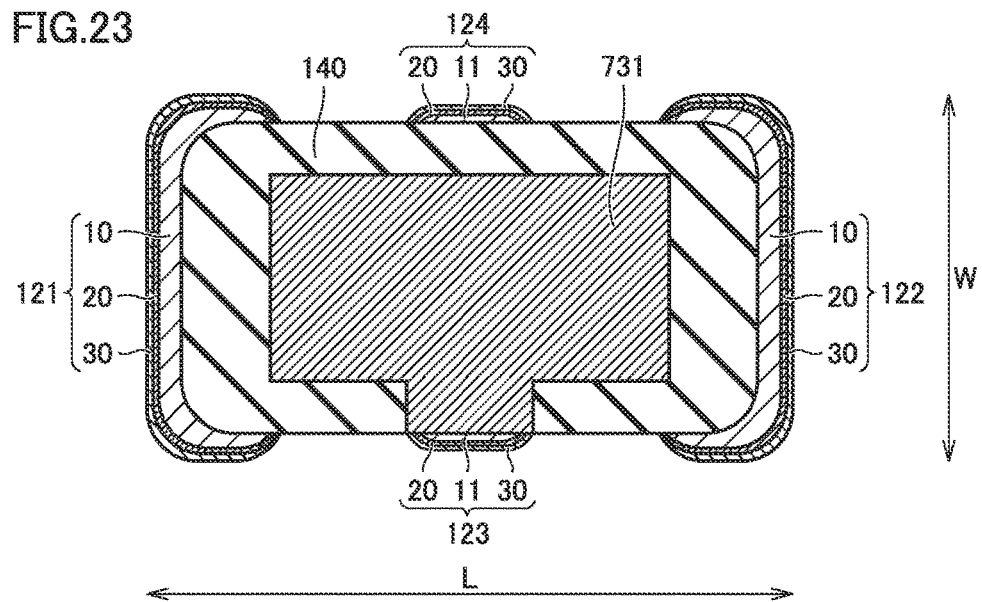
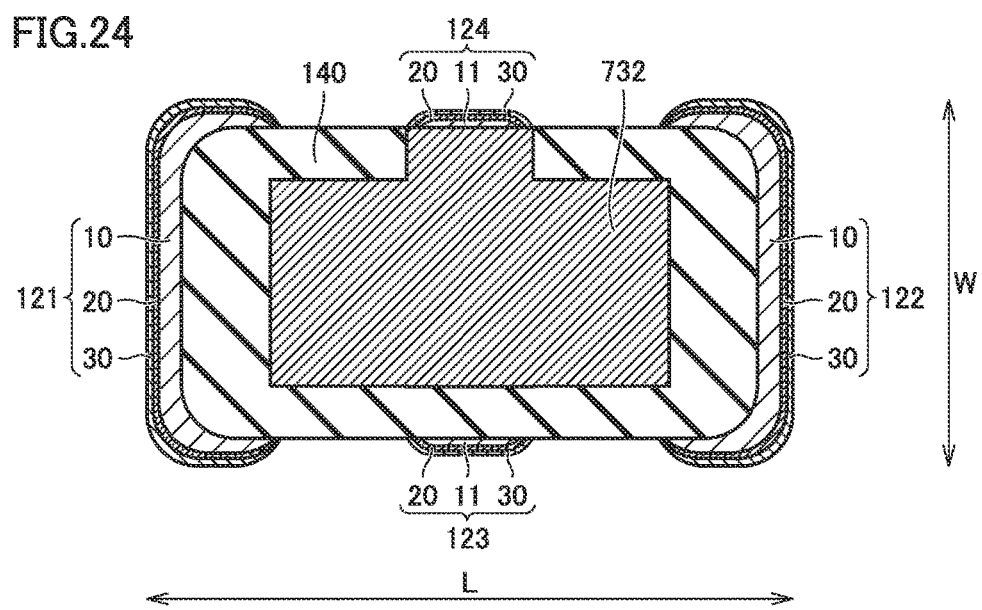

CAPACITOR DEVICE AND COMPOSITE ELECTRONIC COMPONENT INCLUDING THE SAME

BACKGROUND OF THE INVENTION

1. Field of the Invention

The present invention relates to a capacitor device and a composite electronic component which includes the capacitor device.

2. Description of the Related Art

With the aim of increasing the degree of integration of electronic components on a circuit board, a variety of composite electronic components each provided with a resistance element (R) and a capacitor element (C) have been proposed.

For example, Japanese Patent Laying-Open No. 2001-338838 discloses a composite electronic component including a chip-type capacitor and a resistor provided on a surface of a capacitor body of the chip-type capacitor, and the resistor is connected to a pair of external electrodes provided on the surface of the capacitor body to thereby electrically connect a resistance element and a capacitor element.

Japanese Patent Laying-Open No. 6-283301 also discloses a composite electronic component including two or more different chip-type devices selected from the group consisting of a chip-type resistor, a chip-type thermistor, a chip-type capacitor, and a chip-type varistor, for example. The selected chip-type devices are identical in shape and dimensions and have a rectangular parallelepiped shape. These chip-type devices are stacked on one another in the thickness direction of the devices. A leadframe covers respective terminal electrodes provided on the chip-type devices to thereby integrate them.

The composite electronic components disclosed in Japanese Patent Laying-Open Nos. 2001-338838 and 6-283301 each have a closed loop electrically connecting a resistance element (R) and a capacitor element (C) in parallel, and therefore, the degree of design freedom of the composite electronic components is low in terms of circuit design.

SUMMARY OF THE INVENTION

Preferred embodiments of the present invention provide a capacitor device and a composite electronic component including the capacitor device with an increased degree of freedom of circuit design.

According to a first aspect of various preferred embodiments of the present invention, a composite electronic component includes a capacitor device; and a resistance device disposed on the capacitor device and including a resistor. The capacitor device includes a capacitor body including a first internal electrode and a second internal electrode facing each other across a dielectric layer; and a first external electrode, a second external electrode, a third external electrode, and a fourth external electrode each provided on a surface of the capacitor body. The first external electrode and the second external electrode are isolated from each other in a length direction perpendicular or substantially perpendicular to a height direction of the capacitor body. The third external electrode and the fourth external electrode are isolated from each other and located between the first external electrode and the second external electrode in the length direction. The first external electrode is directly connected to the first internal electrode or the second internal electrode. The second external electrode is directly connected to the first internal electrode or the second internal electrode. The resistor is electrically connected to each of the third external electrode and the fourth external electrode.

In a preferred embodiment of the present invention, the resistance device further includes an insulating base, and a first connection electrode and a second connection electrode which are provided on the insulating base. The resistor is directly connected, on the insulating base, to each of the first connection electrode and the second connection electrode. The first connection electrode is electrically connected to the third external electrode. The second connection electrode is electrically connected to the fourth external electrode.

In a preferred embodiment of the present invention, in the height direction of the capacitor body, the insulating base overlaps each of at least a portion of the first external electrode and at least a portion of the second external electrode.

In a preferred embodiment of the present invention, the resistance device preferably includes the resistor which is directly provided on the capacitor device. The resistor is directly connected to each of the third external electrode and the fourth external electrode.

In a preferred embodiment of the present invention, the third external electrode and the fourth external electrode are each provided in a state of being non-connected to the first internal electrode and the second internal electrode in the capacitor device.

In a preferred embodiment of the present invention, the capacitor body further includes a first internal conductor and a second internal conductor which are provided outside a region where the first internal electrode and the second internal electrode face each other as seen in a stack direction in which the first internal electrode and the second internal electrode are stacked, and which are isolated from each other. The first internal conductor is directly connected to the third external electrode. The second internal conductor is directly connected to the fourth external electrode.

In a preferred embodiment of the present invention, the capacitor body further includes a third internal electrode facing at least one of the first internal electrode and the second internal electrode. The third internal electrode is directly connected to the third external electrode or the fourth external electrode.

In a preferred embodiment of the present invention, in the height direction of the capacitor body, a maximum thickness of each of the third external electrode and the fourth external electrode is smaller than a maximum thickness of each of the first external electrode and the second external electrode.

According to a second aspect of various preferred embodiments of the present invention, a capacitor device includes a capacitor body including a first internal electrode and a second internal electrode facing each other across a dielectric layer; and a first external electrode, a second external electrode, a third external electrode, and a fourth external electrode each provided on a surface of the capacitor body. The first external electrode and the second external electrode are isolated from each other in a length direction perpendicular or substantially perpendicular to a height direction of the capacitor body. The third external electrode and the fourth external electrode are isolated from each other and located between the first external electrode and the second external electrode in the length direction. The first external electrode is directly connected to the first internal electrode or the second internal electrode. The second external electrode is directly connected to the first internal electrode or the second internal electrode.

According to a third aspect of various preferred embodiments of the present invention, a composite electronic component includes a capacitor device; and a resistance device disposed on the capacitor device and including a resistor. The capacitor device includes a capacitor body including a first internal electrode and a second internal electrode facing each other across a dielectric layer; and a first external electrode, a second external electrode, a third external electrode, and a fourth external electrode each provided on a surface of the capacitor body. The first external electrode and the second external electrode are isolated from each other in a length direction perpendicular or substantially perpendicular to a height direction of the capacitor body. The third external electrode and the fourth external electrode are isolated from each other and located between the first external electrode and the second external electrode in the length direction. The third external electrode is directly connected to the first internal electrode or the second internal electrode. The fourth external electrode is directly connected to the first internal electrode or the second internal electrode. The resistor is electrically connected to each of the first external electrode and the second external electrode.

In a preferred embodiment of the present invention, the resistance device further includes an insulating base, and a first connection electrode and a second connection electrode which are provided on the insulating base. The resistor is directly connected, on the insulating base, to each of the first connection electrode and the second connection electrode. The first connection electrode is electrically connected to the first external electrode. The second connection electrode is electrically connected to the second external electrode.

In a preferred embodiment of the present invention, in the height direction of the capacitor body, the insulating base overlaps each of at least a portion of the third external electrode and at least a portion of the fourth external electrode.

In a preferred embodiment of the present invention, the first external electrode and the second external electrode are each provided in a state of being non-connected to the first internal electrode and the second internal electrode in the capacitor device.

According to a fourth aspect of various preferred embodiments of the present invention, a capacitor device includes a capacitor body including a first internal electrode and a second internal electrode facing each other across a dielectric layer; and a first external electrode, a second external electrode, a third external electrode, and a fourth external electrode each provided on a surface of the capacitor body. The first external electrode and the second external electrode are isolated from each other in a length direction perpendicular or substantially perpendicular to a height direction of the capacitor body. The third external electrode and the fourth external electrode are isolated from each other and located between the first external electrode and the second external electrode in the length direction. The third external electrode is directly connected to the first internal electrode or the second internal electrode. The fourth external electrode is directly connected to the first internal electrode or the second internal electrode.

In accordance with various preferred embodiments of the present invention, the degree of freedom of circuit design is greatly improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a cross-sectional view of the capacitor device according to the first preferred embodiment of the present invention, as seen in the direction of arrows of a line V-V in FIG. 3.

FIG. 6 is a cross-sectional view of the capacitor device according to the first preferred embodiment of the present invention, as seen in the direction of arrows of a line VI-VI in FIG. 3.

FIG. 7 is a flowchart illustrating a method of manufacturing a capacitor device according to a preferred embodiment of the present invention.

FIG. 8 is a cross-sectional view showing a configuration of a resistance device of the composite electronic component according to the first preferred embodiment of the present invention.

FIG. 23 is a cross-sectional view of the capacitor device according to the seventh preferred embodiment of the present invention, as seen in the direction of arrows of a line XXIII-XXIII in FIG. 21.

FIG. 24 is a cross-sectional view of the capacitor device according to the seventh preferred embodiment of the present invention, as seen in the direction of arrows of a line XXIV-XXIV in FIG. 21.

DETAILED DESCRIPTION OF THE PREFERRED EMBODIMENTS

Figure 1:
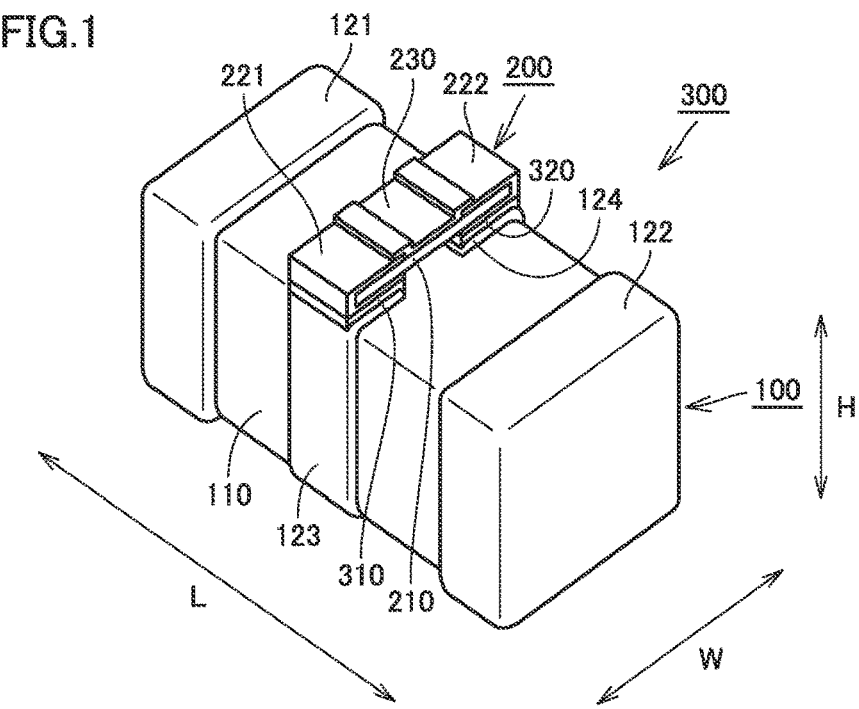
FIG. 1 is a perspective view showing an external appearance of a composite electronic component according to a first preferred embodiment of the present invention.

In the following, a capacitor device and a composite electronic component including the capacitor device according to each preferred embodiment of the present invention will be described in detail with reference to the drawings. In the preferred embodiments illustrated below, the same or corresponding elements are denoted by the same reference characters in the drawings, and a description thereof will not be repeated.

First Preferred Embodiment

Figure 2:
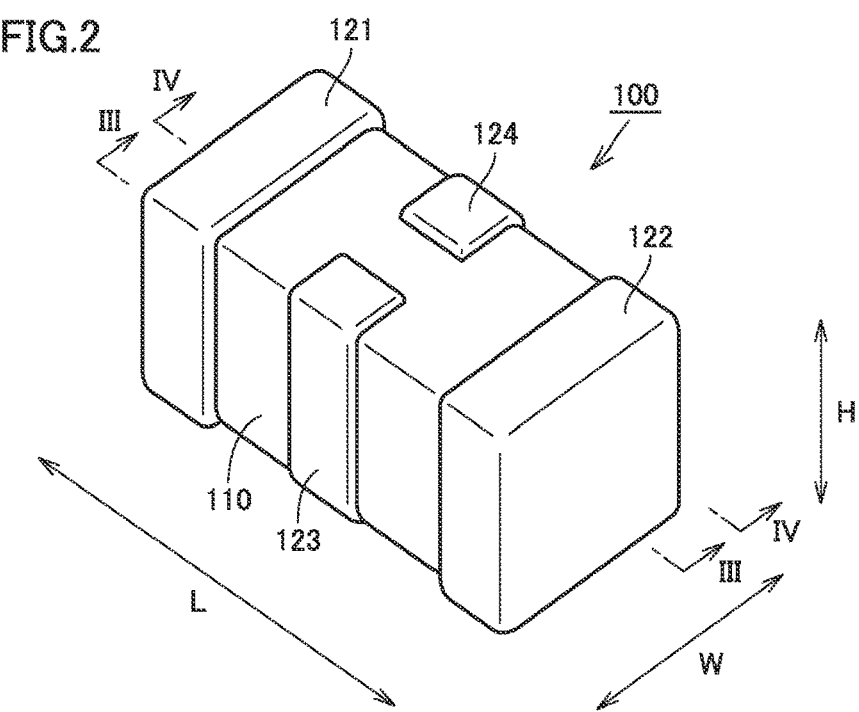
FIG. 2 is a perspective view showing an external appearance of a capacitor device according to the first preferred embodiment of the present invention.
Figure 3:
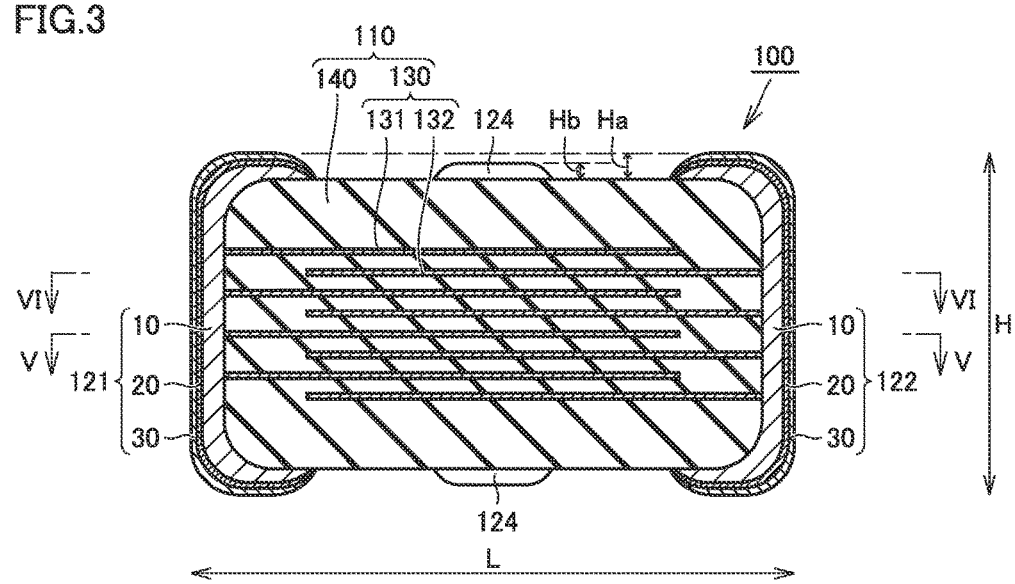
FIG. 3 is a cross-sectional view of the capacitor device according to the first preferred embodiment of the present invention, as seen in the direction of arrows of a line III-III in FIG. 2.
Figure 4:
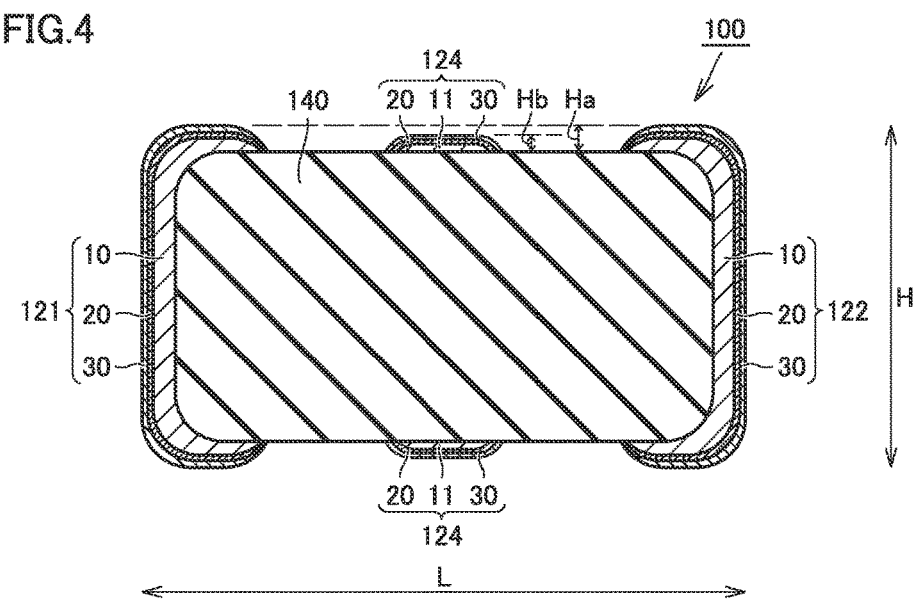
FIG. 4 is a cross-sectional view of the capacitor device according to the first preferred embodiment of the present invention, as seen in the direction of arrows of a line IV-IV in FIG. 2.

FIG. 1 is a perspective view showing an external appearance of a composite electronic component according to a first preferred embodiment of the present invention. FIG. 2 is a perspective view showing an external appearance of a capacitor device according to the first preferred embodiment of the present invention. FIG. 3 is a cross-sectional view of the capacitor device according to the first preferred embodiment of the present invention, as seen in the direction of arrows of a line in FIG. 2. FIG. 4 is a cross-sectional view of the capacitor device according to the first preferred embodiment of the present invention, as seen in the direction of arrows of a line IV-IV in FIG. 2. FIG. 5 is a cross-sectional view of the capacitor device according to the first preferred embodiment of the present invention, as seen in the direction of arrows of a line V-V in FIG. 3. FIG. 6 is a cross-sectional view of the capacitor device according to the first preferred embodiment of the present invention, as seen in the direction of arrows of a line VI-VI in FIG. 3.

As shown in FIG. 1, a composite electronic component 300 in the first preferred embodiment of the present invention includes a capacitor device 100 and a resistance device 200 which is disposed on capacitor device 100 and includes a resistor 230.

Capacitor device 100 has a rectangular or substantially rectangular parallelepiped shape, and its dimension in a length direction L described later herein is larger than its dimension in a width direction W described later herein. The rectangular or substantially rectangular parallelepiped shape includes a shape of capacitor device 100 whose corners and edges are rounded, a shape of capacitor device 100 whose surface is provided with steps or projections/depressions, and the like.

Resistance device 200 has a rectangular or substantially rectangular parallelepiped shape, and its dimension in length direction L described later herein is smaller than its dimension in width direction W described later herein. The rectangular or substantially rectangular parallelepiped shape includes a shape of resistance device 200 whose corners and edges are rounded, a shape of resistance device 200 whose surface is provided with steps or projections/depressions, and the like.

Capacitor device 100 and resistance device 200 are joined to each other by first and second joint portions 310, 320 which are each a solder joint member or an electrically conductive joint member such as electrically conductive adhesive. The method of joining capacitor device 100 and resistance device 200 to each other is not limited to the method by the electrically conductive joint member as described above, and any of other joint methods may be used.

Here, the direction in which capacitor device 100 and resistance device 200 are arranged is defined as height direction H of a capacitor body 110 described later herein, and the direction which is perpendicular or substantially perpendicular to this height direction H and in which first and second external electrodes 121, 122 described later herein of capacitor device 100 are arranged is defined as length direction L, and the direction perpendicular or substantially perpendicular to both the height direction H and the length direction L is defined as width direction W. In the following description, the above-defined terms will be used.

As shown in FIGS. 1 to 6, capacitor device 100 is a multilayer ceramic capacitor, for example, and includes capacitor body 110, a first external electrode 121, a second external electrode 122, a third external electrode 123, and a fourth external electrode 124 which are provided on the surface of capacitor body 110.

Capacitor body 110 preferably includes a plurality of dielectric layers 140 and a plurality of internal electrodes 130 which are alternately stacked on one another. Capacitor body 110 has a rectangular or substantially rectangular parallelepiped shape. In the present preferred embodiment, the stack direction in which a plurality of dielectric layers 140 and a plurality of internal electrodes 130 are stacked is the same as height direction H. Alternatively, the stack direction may be the same as width direction W. A plurality of internal electrodes 130 include a first internal electrode 131 and a second internal electrode 132 which face each other across dielectric layer 140.

Dielectric layer 140 is formed of a ceramic material in which a main component is, for example, barium titanate (BaTiO$_3$), calcium titanate (CaTiO$_3$), strontium titanate (SrTiO$_3$), or calcium zirconate (CaZrO$_3$), or the like. Dielectric layer 140 may also contain, as a sub component, Mn, Mg, Si, Co, Ni, or rare earth, or the like. In contrast, internal electrode 130 is formed of a metal material such as Ni, Cu, Ag, Pd, Ag—Pd alloy, or Au, for example.

First external electrode 121 and second external electrode 122 are isolated from each other in length direction L of capacitor body 110. Third external electrode 123 and fourth external electrode 124 are isolated from each other and are located between first external electrode 121 and second external electrode 122 in the length direction L.

First external electrode 121, second external electrode 122, third external electrode 123, and fourth external electrode 124 each include a base layer 10, 11, a reinforcement layer 20 containing at least one of Cu and Ni, and an external connection layer 30 containing Sn. Base layer 10, 11 is formed, for example, by baking a paste containing glass and metal such as Cu, Ni, Ag, Pd, Ag—Pd alloy, Au, or the like. In the present preferred embodiment, a main component of the metal contained in base layer 10 is Cu, and a main component of the metal contained in base layer 11 is Ni.

First external electrode 121, second external electrode 122, third external electrode 123, and fourth external electrode 124 each may include a sputter layer as base layer 10, 11 that is formed by sputtering. First external electrode 121, second external electrode 122, third external electrode 123, and fourth external electrode 124 each may be formed of only a plating layer, or may include an electrically conductive film which is produced by hardening an electrically conductive resin paste containing a metal component and a resin component.

Capacitor body 110 includes a pair of end surfaces opposite to each other in length direction L, a pair of side surfaces opposite to each other in width direction W, and a pair of main surfaces opposite to each other in height direction H. Among these surfaces, an upper surface which is one of the pair of main surfaces opposite to each other in height direction H faces resistance device 200.

First external electrode 121 abuts one end surface of capacitor body 110 and respective portions of the pair of side surfaces and the pair of main surfaces of capacitor body 110. Second external electrode 122 abuts the other end surface of capacitor body 110 and respective portions of the pair of side surfaces and the pair of main surfaces of capacitor body 110.

Third external electrode 123 abuts a central portion, in length direction L, of one side surface of capacitor body 110 and respective portions of the upper surface and a lower surface, which is the other main surface, of capacitor body 110. Fourth external electrode 124 abuts a central portion, in length direction L, of the other side surface of capacitor body 110 and respective portions of the upper surface and the lower surface of capacitor body 110.

As shown in FIG. 3, first internal electrode 131, which is one of a pair of internal electrodes 130 adjacent to each other across dielectric layer 140 in height direction H, is directly connected, in capacitor device 100, to first external electrode 121, and second internal electrode 132 is directly connected, in capacitor device 100, to second external electrode 122. First internal electrode 131 and second internal electrode 132 face each other across the dielectric layer. Thus, the region between first external electrode 121 and second external electrode 122 is in the state where a plurality of capacitor elements (C) are electrically connected in parallel.

In the present preferred embodiment, third external electrode 123 and fourth external electrode 124 are each provided in a state of being non-connected to first internal electrode 131 and second internal electrode 132 in capacitor device 100.

A description will now be given of a method of manufacturing capacitor device 100 according to a preferred embodiment of the present invention. FIG. 7 is a flowchart illustrating a method of manufacturing the capacitor device according to the present preferred embodiment.

As shown in FIG. 7, firstly a mother stack is fabricated (S100). The mother stack is fabricated in the following way. A ceramic paste containing ceramic powder is applied in the form of a sheet by die coater method, gravure coater method, or microgravure coater method, or the like, and the applied paste is dried to fabricate a ceramic green sheet.

On each of some of a plurality of fabricated ceramic green sheets, an electrically conductive paste to define an internal electrode is applied to form a predetermined pattern, by screen printing method, ink jet printing method, or gravure printing method, or the like. The ceramic green sheets each including the conductive pattern thus formed on the sheet to define and function as internal electrode 130 are stacked one after another on a predetermined number of stacked ceramic green sheets having no conductive pattern formed thereon. Further, on the stacked green sheets each having the conductive pattern formed on each sheet, a predetermined number of ceramic green sheets having no conductive pattern are stacked. Accordingly, the mother stack is fabricated. As required, the mother stack may be pressed in the direction in which the sheets are stacked, by isostatic pressing or the like.

Next, on the surfaces (upper surface and lower surface) of the mother stack, an Ni film is formed by printing method or sputtering method (S110). This Ni film contains a glass component.

After this, the mother stack is cut to be divided in a predetermined shape, to thus fabricate a plurality of soft stacks each having a rectangular or substantially rectangular parallelepiped shape. Barrel polishing is performed on the soft stack in the rectangular or substantially rectangular parallelepiped shape, so as to round the corners of the soft stack. Barrel polishing, however, may not necessarily be performed. On the side surfaces of the soft stack that are exposed after the mother stack is cut, an Ni film having the same composition as the Ni film formed in step S110 is formed (S120). In the present preferred embodiment, the Ni film is formed on the side surfaces of capacitor body 110 by a printing method. Alternatively, the Ni film may be formed on the side surfaces of capacitor body 110 by a sputtering method.

The soft stack is sintered to be hardened. Thus, capacitor body 110 on which base layer 11 of each of third external electrode 123 and fourth external electrode 124 is provided is fabricated (S130). Namely, the Ni film provided in step S110 and the Ni film provided in step S120 form base layer 11. The sintering temperature is set appropriately depending on the type of the ceramic material and the type of the conductive material. For example, the sintering temperature is preferably set to a temperature in a range from about 900° C. to about 1300° C., inclusive.

Next, a Cu film is formed on an end surface of capacitor body 110 (S140). In the present preferred embodiment, the Cu film is formed on both end surfaces of capacitor body 110 by dip method.

Next, the Cu film is sintered to thus provide base layer 10 of first external electrode 121 and second external electrode 122 each (S150). By heating at a temperature, for example, of approximately 700° C., base layer 10 is baked on capacitor body 110. Formation and drying of the Cu film may be repeated to provide a plurality of base layers 10.

Next, Ni plating is performed on base layers 10, 11 of first external electrode 121, second external electrode 122, third external electrode 123, and fourth external electrode 124, to provide reinforcement layer 20 (S160). Specifically, reinforcement layer 20 is provided by a barrel plating method. Namely, a plurality of capacitor bodies 110 on which base layers 10, 11 are provided are placed in a barrel, and this barrel is immersed in a plating solution in a plating bath. While the immersed barrel is rotated, electrical energy is applied, to provide reinforcement layer 20 on base layers 10, 11.

Next, Sn plating is performed on reinforcement layer 20 of each of first external electrode 121, second external electrode 122, third external electrode 123, and fourth external electrode 124, to provide external connection layer 30 (S170). In the present preferred embodiment, external connection layer 30 is provided through electroplating. Specifically, external connection layer 30 is provided by a barrel plating method. Namely, a plurality of capacitor bodies 110 on which base layers 10, 11 and reinforcement layer 20 are provided are placed in a barrel, and this barrel is immersed in a plating solution in a plating bath. While the immersed barrel is rotated, electrical energy is applied, to provide external connection layer 30 on reinforcement layer 20.

Through the above-described steps, capacitor device 100 is fabricated. Instead of forming the Ni film in steps S120 and S130, a Cu film may be formed as base layer 11 in step S140. In this case, between two transfer rollers having respective surfaces on which a Cu paste is applied, respective central portions, in length direction L, of the opposite side surfaces of capacitor body 110 can be held to form Cu films to define and function as base layers 11 on the central portions, in length direction L, of the opposite side surfaces of capacitor body 110.

Because base layer 11 of each of third external electrode 123 and fourth external electrode 124 is formed by a printing method or a sputtering method, base layer 11 is thinner than base layer 10 of each of first external electrode 121 and second external electrode 122 that is formed by a dip method. In first external electrode 121, second external electrode 122, third external electrode 123, and fourth external electrode 124, reinforcement layer 20 and external connection layer 30 are formed similarly by plating. Therefore, reinforcement layer 20 and external connection layer 30 are equal or substantially equal to each other in thickness.

Thus, as shown in FIGS. 3 and 4, because of the fact that base layer 11 is thinner than base layer 10, a maximum thickness Hb of each of third external electrode 123 and fourth external electrode 124 is smaller than a maximum thickness Ha of each of first external electrode 121 and second external electrode 122, in height direction H of capacitor body 110. Resistance device 200 is disposed on third and fourth external electrodes 123, 124. Therefore, the relation Ha>Hb can be satisfied to restrict the height in height direction H of composite electronic component 300, and thus achieve a low profile of composite electronic component 300.

A description will now be given of resistance device 200 of composite electronic component 300. FIG. 8 is a cross-sectional view showing a configuration of a resistance device of the composite electronic component according to the first preferred embodiment of the present invention. As shown in FIGS. 1 and 8, resistance device 200 of composite electronic component 300 in the first preferred embodiment of the present invention further includes an insulating base 210, and a first connection electrode 221 and a second connection electrode 222 which are provided on insulating base 210.

Insulating base 210 preferably has a flat plate shape and is preferably made of, for example, a resin material such as epoxy resin or a ceramic material such as alumina, or made of a material in which filler or woven fabric or the like made of an inorganic material or an organic material is added, or the like. Preferably, an alumina substrate or a ceramic substrate which includes low-temperature co-fired ceramic is used as insulating base 210.

Insulating base 210 includes a pair of length-direction side surfaces opposite to each other in length direction L, a pair of width-direction side surfaces opposite to each other in width direction W, and a pair of main surfaces opposite to each other in height direction H. The lower surface which is one of the pair of main surfaces faces capacitor device 100.

As shown in FIGS. 1 and 8, resistor 230 is provided on a central portion, in width direction W, of the upper surface of insulating base 210, and has a rectangular or substantially rectangular film shape or an interconnection pattern shape as seen in plan view, for example. For example, a metal film, a metal oxide film, a metal glaze film which is a mixture of a metal oxide film and glass, or the like, may be used as resistor 230.

First connection electrode 221 and second connection electrode 222 are isolated from each other in width direction W. First connection electrode 221 abuts one width-direction side surface of insulating base 210 and respective portions of the pair of main surfaces of insulating base 210. Second connection electrode 222 abuts the other width-direction side surface and respective portions of the pair of main surfaces. Each of first and second connection electrodes 221, 222 includes an electrically conductive film. Preferably, each of first and second connection electrodes 221, 222 is made of a metal material such as Cu, Ni, or Sn, or the like, and formed by plating, baking of a conductive paste, or sputtering method, or the like.

Resistor 230 is located, in width direction W, between first connection electrode 221 and second connection electrode 222. One end, in width direction W, of resistor 230 covers a portion of first connection electrode 221, while the other end thereof covers a portion of second connection electrode 222. Accordingly, resistor 230 is directly connected, on insulating base 210, to each of first and second connection electrodes 221, 222.

Resistance device 200 is fabricated, for example, in accordance with a procedure described below.

First, an electrically conductive paste is printed on the upper surface and the lower surface of insulating base 210 and the printed paste is baked, or a metal material is deposited on the upper surface and the lower surface of insulating base 210 by a sputtering method. Further, an electrically conductive paste is applied to one width-direction side surface and the other width-direction side surface of insulating base 210 and the applied paste is hardened, or a plating layer is formed on one width-direction side surface and the other width-direction side surface of insulating base 210, to thus form first and second connection electrodes 221, 222.

Next, on the upper surface of insulating base 210, a material which is to form resistor 230 is formed by printing or the like, and thus resistor 230 is directly connected to each of first connection electrode 221 and second connection electrode 222.

Through the steps as described above, resistance device 200 is fabricated. The above-described procedure is merely an example, and formation of each portion by any method other than the above-described one is possible. A collective body into which a plurality of resistance devices 200 are integrated may be produced in advance, and the collective body may be divided to thus fabricate a plurality of resistance devices 200 all together.

As shown in FIG. 1, regarding composite electronic component 300 in the present preferred embodiment, resistance device 200 on capacitor body 110 is isolated from each of first external electrode 121 and second external electrode 122 and disposed between first external electrode 121 and second external electrode 122. As described above, capacitor device 100 and resistance device 200 are joined to each other by first and second joint portions 310, 320.

More specifically, resistance device 200 is mounted at the upper surface side of capacitor device 100 in height direction H, and accordingly, the lower surface of insulating base 210 and the upper surface of capacitor body 110 face each other in height direction H, third external electrode 123 of capacitor device 100 and first connection electrode 221 of resistance device 200 are joined together by first joint portion 310, and fourth external electrode 124 of capacitor device 100 and second connection electrode 222 of resistance device 200 are joined together by second joint portion 320.

In this way, first connection electrode 221 is electrically connected by first joint portion 310 to third external electrode 123. Second connection electrode 222 is electrically connected by second joint portion 320 to fourth external electrode 124.

Resistor 230 provided as a portion of resistance device 200 is electrically connected to first and second connection electrodes 221, 222 of resistance device 200 as described above. Therefore, resistor 230 is electrically connected to each of third and fourth external electrodes 123, 124 which are electrically connected to first and second connection electrodes 221, 222, respectively.

Figure 9:
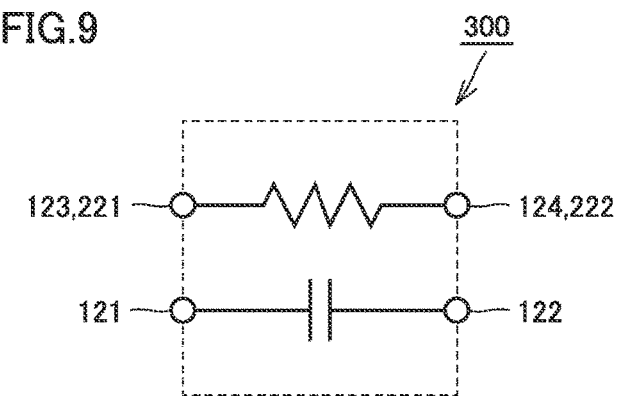
FIG. 9 is a diagram showing an equivalent circuit of the composite electronic component according to the first preferred embodiment of the present invention.

FIG. 9 is a diagram showing an equivalent circuit of the composite electronic component according to the first preferred embodiment of the present invention. As shown in FIG. 9, the circuit of composite electronic component 300 in the present preferred embodiment does not have a closed loop electrically connecting a resistance element (R) and a capacitor element (C) in parallel in composite electronic component 300, and therefore has a high degree of design freedom, in terms of circuit design. Namely, by a circuit board on which this composite electronic component 300 is mounted, the resistance element (R) and the capacitor element (C) are electrically connected and thus these elements are able to be connected either in series or parallel. In some cases, these elements can also be connected to respective circuits different from each other. Thus, a composite electronic component applicable to a variety of circuits is able to be implemented.

In addition, composite electronic component 300 configured in the above-described manner is able to produce an effect of reducing the mount area where the component is mounted (increasing the degree of integration of electronic components on a circuit board), through the integration of capacitor device 100 and resistance device 200 into the composite component.

Here, for the sake of reduction of the mount area, preferably the dimension of capacitor device 100 in length direction L is larger than the dimension of resistance device 200 in length direction L, and preferably the dimension of capacitor device 100 in width direction W is larger than the dimension of resistance device 200 in width direction W. For the sake of mount stability of composite electronic component 300, preferably the dimension of capacitor device 100 in height direction H is larger than the dimension of resistance device 200 in height direction H.

As seen from the foregoing, regarding composite electronic component 300 and capacitor device 100 thereof in the present preferred embodiment, a resistance element (R) and a capacitor element (C) each having desired electrical characteristics are able to be combined easily. Accordingly, not only increase of the degree of design freedom of the composite electronic component itself, but also increase of the degree of design freedom of the circuit design of a circuit board on which the composite electronic component is mounted are able to be achieved.

Here, multiple types of devices which are different in electrical characteristics may be prepared as capacitor device 100 to be included in the composite component, and multiple types of devices which are different in electrical characteristics may also be prepared as resistance device 200 to be included in the composite component. Then, any of these devices may be selected and combined as appropriate to enable easy manufacture of a composite electronic component including both a resistance element (R) and a capacitor element (C) each having desired electrical characteristics.

In the above-described preferred embodiment, first and second connection electrodes 221, 222 to which resistor 230 is connected preferably are isolated from each other in width direction W in which third external electrode 123 and fourth external electrode 124 of capacitor device 100 are arranged. In this way, the distance between first connection electrode 221 and second connection electrode 222 is able to be increased and the area where resistor 230 can be formed on the upper surface of insulating base 210 is able to be increased. Thus, both the ensured electrical insulation between first and second connection electrodes 221, 222 and the ensured freedom of adjustment of electrical characteristics of resistor 230 are able to be achieved.

Second Preferred Embodiment

In the following, a description will be given of a capacitor device according to a second preferred embodiment of the present invention as well as a composite electronic component including the capacitor device. The capacitor device in the second preferred embodiment differs from capacitor device 100 in the first preferred embodiment only in terms of the fact that the capacitor body includes an internal conductor in the second preferred embodiment. Therefore, any element similar to the corresponding element of capacitor device 100 in the first preferred embodiment is denoted by the same reference character, and the description thereof will not be repeated.

Figure 10:
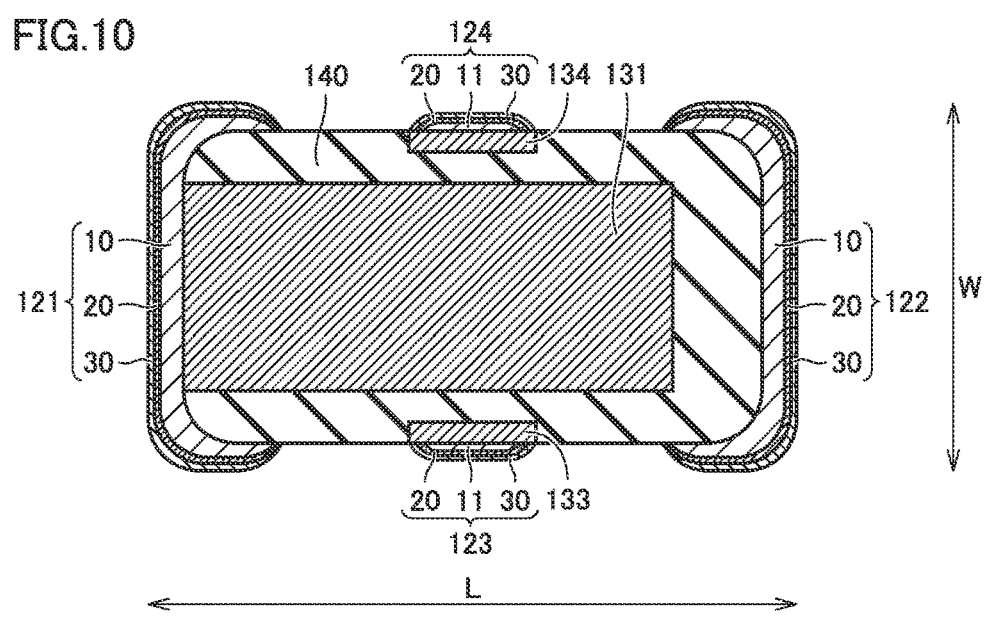
FIG. 10 is a cross-sectional view showing a configuration of a capacitor device according to a second preferred embodiment of the present invention, the shown cross section corresponding to the cross section as seen in the direction of arrows of line V-V in FIG. 3.
Figure 11:
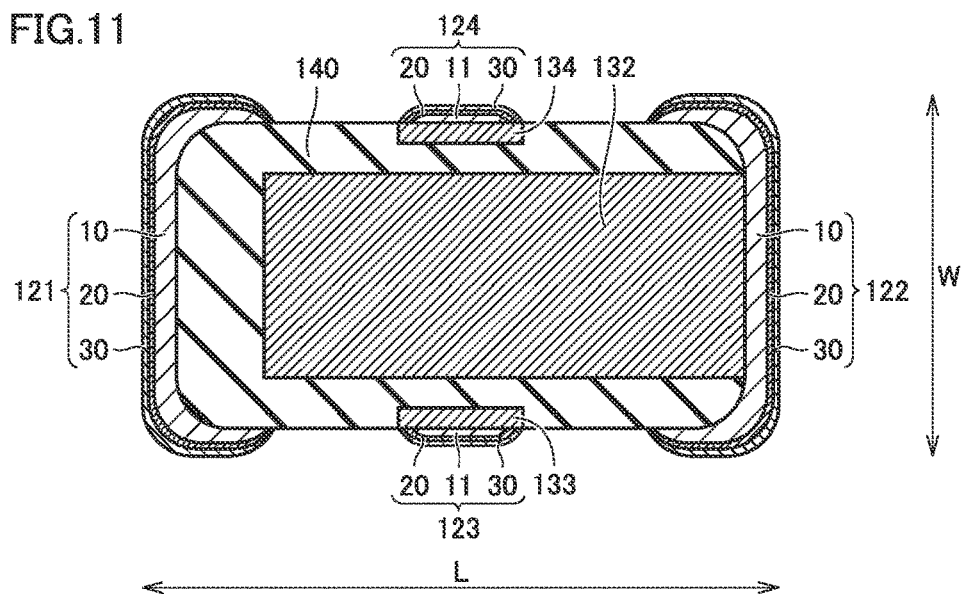
FIG. 11 is a cross-sectional view showing the configuration of the capacitor device according to the second preferred embodiment of the present invention, the shown cross section corresponding to the cross section as seen in the direction of arrows of line VI-VI in FIG. 3.

FIG. 10 is a cross-sectional view showing a configuration of the capacitor device according to the second preferred embodiment of the present invention, and the shown cross section corresponds to the cross section as seen in the direction of arrows of line V-V in FIG. 3. FIG. 11 is a cross-sectional view showing the configuration of the capacitor device according to the second preferred embodiment of the present invention, and the shown cross section corresponds to the cross section as seen in the direction of arrows of line VI-VI in FIG. 3.

As shown in FIGS. 10 and 11, regarding the capacitor device in the second preferred embodiment of the present invention, the capacitor body further includes a first internal conductor 133 and a second internal conductor 134 which are provided outside the region where first internal electrode 131 and second internal electrode 132 face each other as seen in the stack direction of first internal electrode 131 and second internal electrode 132, and which are isolated from each other.

First internal electrode 131 is provided in the same layer as a corresponding layer of first internal conductor 133 and second internal conductor 134, and second internal electrode 132 is provided in the same layer as another corresponding layer of first internal conductor 133 and second internal conductor 134. Specifically, a ceramic green sheet on which an electrically conductive paste to form an internal electrode and an electrically conductive paste to form an internal conductor are applied is sintered, to allow each of first internal electrode 131 and second internal electrode 132 to be formed in the same layer as a corresponding layer of first and second internal conductors 133, 134.

Although the conductive paste to define an internal electrode and the conductive paste to define the internal conductor are preferably the same conductive paste in the present preferred embodiment, they may be different conductive pastes.

First internal conductor 133 is provided in a central portion, in length direction L, of capacitor body 110, and exposed on one side surface of capacitor body 110 and directly connected to third external electrode 123. Second internal conductor 134 is provided in a central portion, in length direction L, of capacitor body 110, and exposed on the other side surface of capacitor body 110 and directly connected to fourth external electrode 124.

Since each of first and second internal conductors 133, 134 is provided outside the region where first internal electrode 131 and second internal electrode 132 face each other (capacitor-formed region), each of first and second internal conductors 133, 134 does not define or function as an internal electrode of the capacitor.

Regarding the capacitor device in the present preferred embodiment, third external electrode 123 is connected to first internal conductor 133 and fourth external electrode 124 is connected to second internal conductor 134, and therefore, third and fourth external electrodes 123, 124 are able to be prevented from peeling off from capacitor body 110. A plating film preferably extends from first and second internal conductors 133, 134 exposed on the side surfaces of capacitor body 110, and therefore, it is unnecessary to provide base layer 11 of third and fourth external electrodes 123, 124 on the side surface of capacitor body 110. In this case, a portion of each of third and fourth external electrodes 123, 124 that is located on the side surface of capacitor body 110 is defined by a plating film only.

Third Preferred Embodiment

In the following, a description will be given of a capacitor device according to a third preferred embodiment of the present invention as well as a composite electronic component including the capacitor device. The capacitor device in the third preferred embodiment differs from capacitor device 100 in the first preferred embodiment chiefly in terms of electrical connection of first and second internal electrodes. Therefore, any element similar to the corresponding element of capacitor device 100 in the first preferred embodiment is denoted by the same reference character, and the description thereof will not be repeated.

Figure 12:
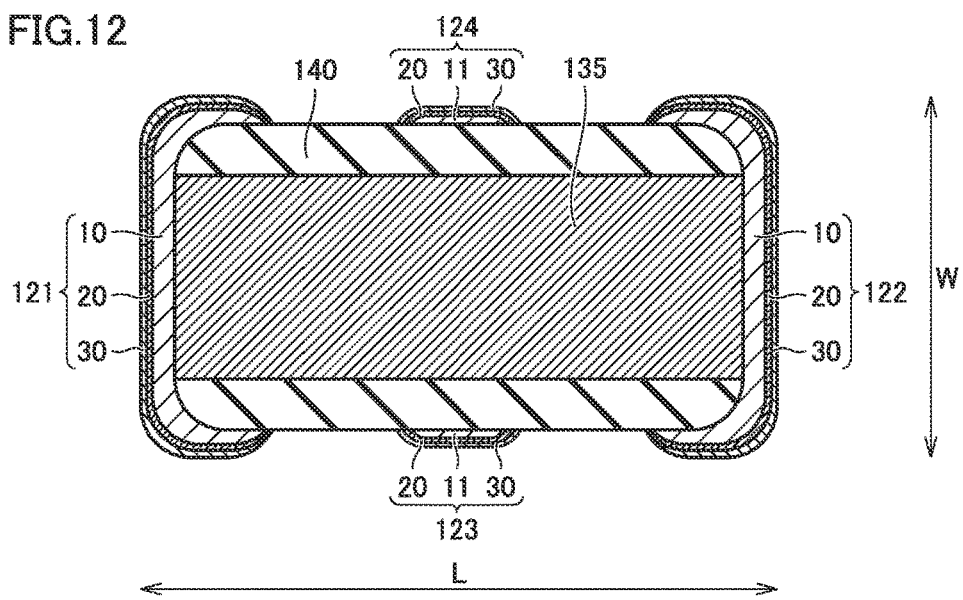
FIG. 12 is a cross-sectional view showing a configuration of a capacitor device according to a third preferred embodiment of the present invention, the shown cross section corresponding to the cross section as seen in the direction of arrows of line V-V in FIG. 3.
Figure 13:
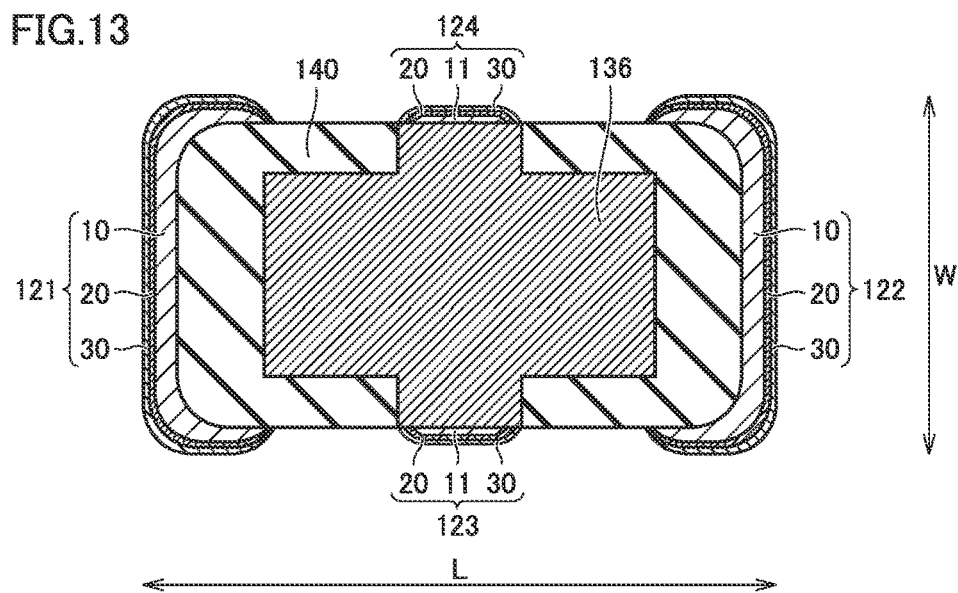
FIG. 13 is a cross-sectional view showing the configuration of the capacitor device according to the third preferred embodiment of the present invention, the shown cross section corresponding to the cross section as seen in the direction of arrows of line VI-VI in FIG. 3.

FIG. 12 is a cross-sectional view showing a configuration of the capacitor device according to the third preferred embodiment of the present invention, the shown cross section corresponds to the cross section as seen in the direction of arrows of line V-V in FIG. 3. FIG. 13 is a cross-sectional view showing the configuration of the capacitor device according to the third preferred embodiment of the present invention, the shown cross section corresponds to the cross section as seen in the direction of arrows of line VI-VI in FIG. 3.

As shown in FIG. 12, in the capacitor device in the third preferred embodiment of the present invention, a first internal electrode 135 extends from one end surface to the other end surface in length direction L. Accordingly, first external electrode 121 is directly connected to first internal electrode 135 and second external electrode 122 is directly connected to first internal electrode 135.

A second internal electrode 136 and first internal electrode 135 face each other across dielectric layer 140, and second internal electrode 136 extends from one side surface to the other side surface in a central portion in length direction L. Accordingly, third external electrode 123 is directly connected to second internal electrode 136 and fourth external electrode 124 is directly connected to second internal electrode 136.

Regarding the capacitor device in the present preferred embodiment, third external electrode 123 is connected to second internal electrode 136 and fourth external electrode 124 is connected to second internal electrode 136, and therefore, third and fourth external electrodes 123, 124 are prevented from peeling off from the capacitor body.

Fourth Preferred Embodiment

In the following, a description will be given of a capacitor device according to a fourth preferred embodiment of the present invention as well as a composite electronic component including the capacitor device. The capacitor device in the fourth preferred embodiment differs from capacitor device 100 in the first preferred embodiment chiefly in terms of the fact that the capacitor device further includes a third internal electrode in the fourth preferred embodiment. Therefore, any element similar to the corresponding element of capacitor device 100 in the first preferred embodiment is denoted by the same reference character, and the description thereof will not be repeated.

Figure 14:
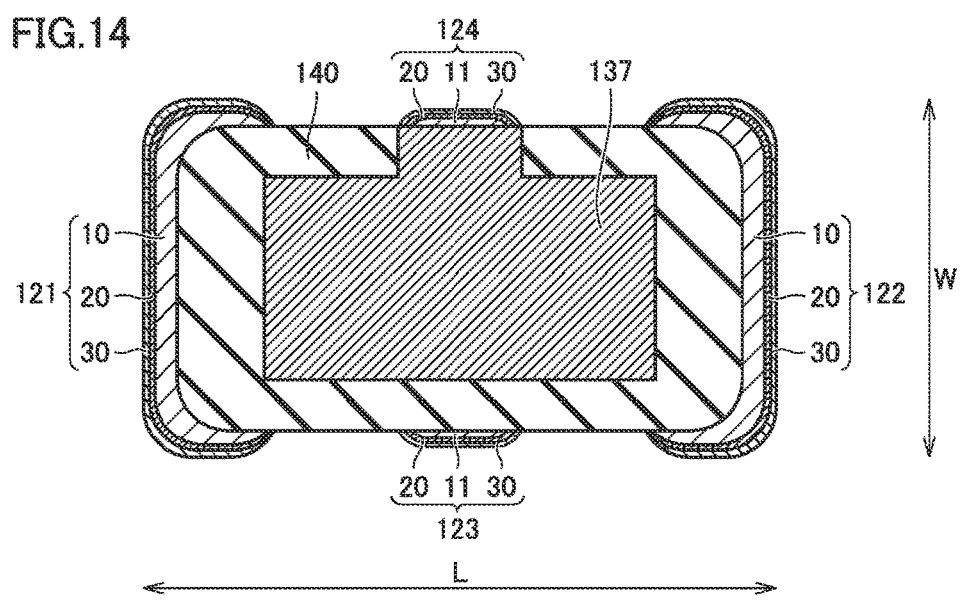
FIG. 14 is a cross-sectional view showing a configuration of a capacitor device according to a fourth preferred embodiment of the present invention.

FIG. 14 is a cross-sectional view showing a configuration of the capacitor device according to the fourth preferred embodiment of the present invention. As shown in FIG. 14, in the capacitor device in the fourth preferred embodiment of the present invention, the capacitor body further includes a third internal electrode 137 which faces at least one of first internal electrode 131 and second internal electrode 132. Third internal electrode 137 is directly connected to at least one of third external electrode 123 and fourth external electrode 124.

In the present preferred embodiment, third internal electrode 137 faces first internal electrode 131 across dielectric layer 140 and also faces second internal electrode 132 across dielectric layer 140. Third internal electrode 137 is directly connected to fourth external electrode 124. Alternatively, third internal electrode 137 may be stacked as an outermost one of a plurality of internal electrodes 130 in the stack direction, and face only first internal electrode 131 or only second internal electrode 132. Third internal electrode 137 may be directly connected to third external electrode 123.

Regarding the capacitor device in the present preferred embodiment, fourth external electrode 124 is connected to third internal electrode 137, and therefore, fourth external electrode 124 is prevented from peeling off from the capacitor body. Like the capacitor devices in the third and fourth preferred embodiments, the shape of the internal electrode is able to be changed to thus change the form of connection between the resistance element (R) and the capacitor element (C) to any of a variety of connection structures, without changing the external shape of the capacitor device. Thus, a high degree of design freedom in terms of circuit design is achieved.

Fifth Preferred Embodiment

In the following, a description will be given of a capacitor device as well as a composite electronic component including the capacitor device according to a fifth preferred embodiment of the present invention. The composite electronic component in the fifth preferred embodiment differs from composite electronic component 300 in the first preferred embodiment only in terms of the fact that the resistor is directly provided on the capacitor device in the fifth preferred embodiment. Therefore, any element similar to the corresponding element of composite electronic component 300 in the first preferred embodiment is denoted by the same reference character, and the description thereof will not be repeated.

Figure 15:
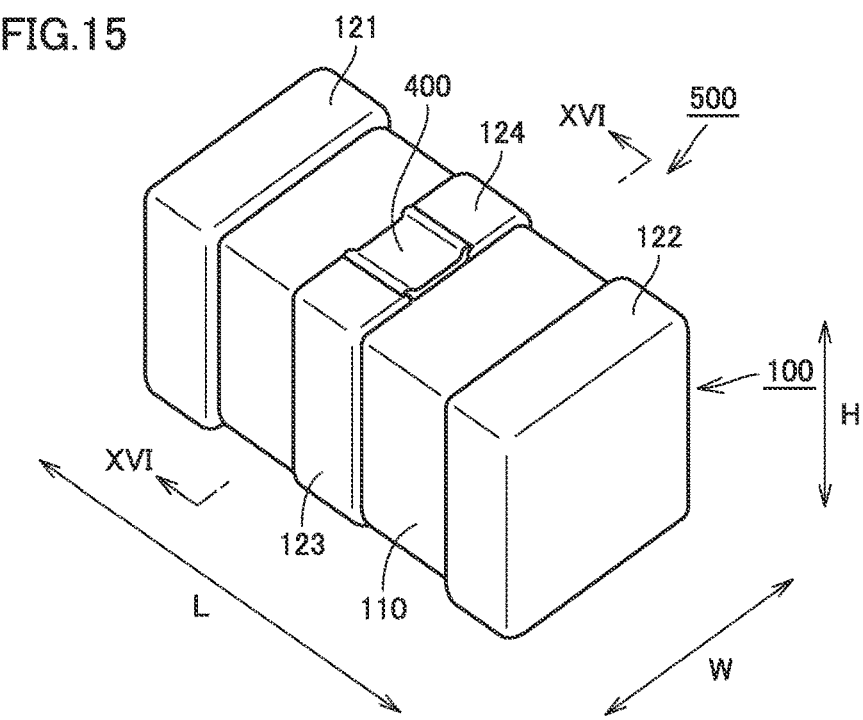
FIG. 15 is a perspective view showing an external appearance of a composite electronic component according to a fifth preferred embodiment of the present invention.
Figure 16:
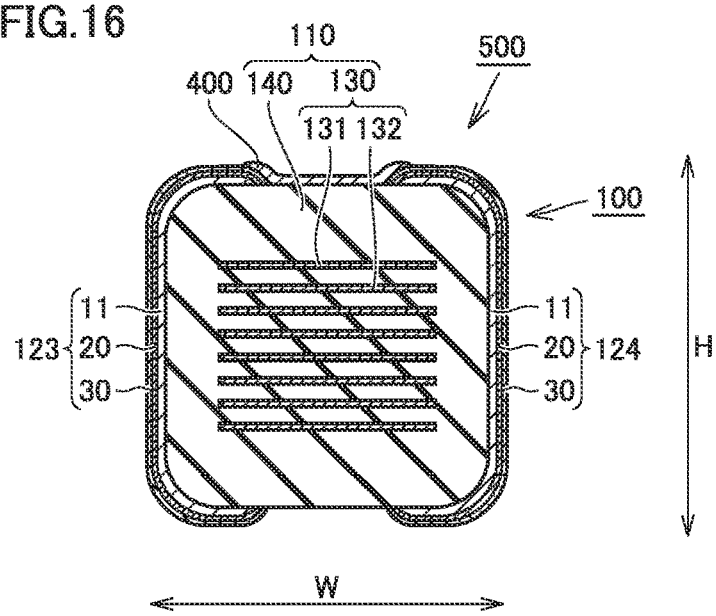
FIG. 16 is a cross-sectional view of the composite electronic component according to the fifth preferred embodiment of the present invention, as seen in the direction of arrows of a line XVI-XVI in FIG. 15.

FIG. 15 is a perspective view showing an external appearance of the composite electronic component according to the fifth preferred embodiment of the present invention. FIG. 16 is a cross-sectional view of the composite electronic component according to the fifth preferred embodiment of the present invention, as seen in the direction of arrows of a line XVI-XVI in FIG. 15.

As shown in FIGS. 15 and 16, regarding a composite electronic component 500 in the fifth preferred embodiment of the present invention, the resistance device includes a resistor 400 which is directly provided on capacitor device 100. Resistor 400 is directly connected to each of third external electrode 123 and fourth external electrode 124.

Resistor 400 is provided on a central portion, in width direction W, of the upper surface of capacitor body 110, and has a rectangular or substantially rectangular film shape or an interconnection pattern shape as seen in plan view, for example. For example, a metal film, a metal oxide film, a metal glaze film which is a mixture of a metal oxide film and glass, or the like, may be used as resistor 400. Resistor 400 is preferably formed by printing, on the upper surface of capacitor body 110, a material which is to form resistor 400, for example.

Resistor 400 is located, in width direction W, between third external electrode 123 and fourth external electrode 124. One end, in width direction W, of resistor 400 covers a portion of third external electrode 123, while the other end thereof covers a portion of fourth external electrode 124. Accordingly, resistor 400 is directly connected, on capacitor body 110, to each of third and fourth external electrodes 123, 124.

An equivalent circuit of composite electronic component 500 in the present preferred embodiment is identical to the equivalent circuit of composite electronic component 300 in the first preferred embodiment. Thus, the circuit of composite electronic component 500 in the present preferred embodiment does not have a closed loop electrically connecting a resistance element (R) and a capacitor element (C) in parallel in composite electronic component 500, and therefore has a high degree of design freedom, in terms of circuit design. Namely, by a circuit board on which this composite electronic component 300 is mounted, the resistance element (R) and the capacitor element (C) are electrically connected and thus these elements are able to be connected either in series or parallel. In some cases, these elements can also be connected to respective circuits different from each other. Thus, a composite electronic component applicable to a variety of circuits is able to be implemented.

In addition, composite electronic component 500 configured in the above-described manner reduces the mount area where the component is mounted (increasing the degree of integration of electronic components on a circuit board), through the integration of capacitor device 100 and the resistance device into the composite component.

Moreover, regarding composite electronic component 500 in the present preferred embodiment, the resistance device does not include the insulating base. Therefore, composite electronic component 500 still has a still lower profile relative to composite electronic component 300 in the first preferred embodiment.

Further, regarding composite electronic component 500 in the present preferred embodiment, third external electrode 123 is connected to resistor 400 and fourth external electrode 124 is connected to resistor 400. Therefore, third and fourth external electrodes 123, 124 are able to be prevented from peeling off from the capacitor body.

Sixth Preferred Embodiment

In the following, a description will be given of a capacitor device as well as a composite electronic component including the capacitor device according to a sixth preferred embodiment of the present invention. The composite electronic component in the sixth preferred embodiment differs from composite electronic component 300 in the first preferred embodiment only in terms of the fact that the resistance device is provided to cover the upper surface of the capacitor device in the sixth preferred embodiment. Therefore, any element similar to the corresponding element of composite electronic component 300 in the first preferred embodiment is denoted by the same reference character, and the description thereof will not be repeated.

Figure 17:
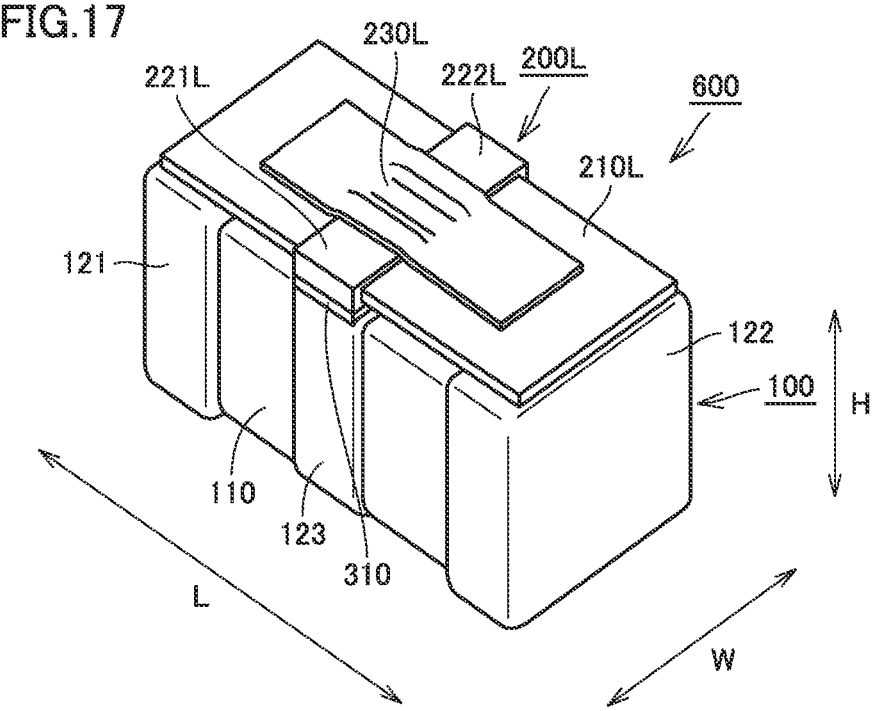
FIG. 17 is a perspective view showing an external appearance of a composite electronic component according to a sixth preferred embodiment of the present invention.
Figure 18:
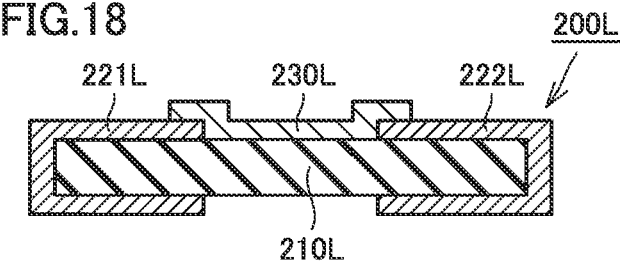
FIG. 18 is a cross-sectional view showing a configuration of a resistance device of the composite electronic component according to the sixth preferred embodiment of the present invention.

FIG. 17 is a perspective view showing an external appearance of the composite electronic component according to the sixth preferred embodiment of the present invention. FIG. 18 is a cross-sectional view showing a configuration of the resistance device of the composite electronic component according to the sixth preferred embodiment of the present invention. The cross section shown in FIG. 18 corresponds to the cross section shown in FIG. 8.

As shown in FIGS. 17 and 18, a composite electronic component 600 in the sixth preferred embodiment of the present invention includes a capacitor device 100 and a resistance device 200L which is disposed on capacitor device 100 and includes a resistor 230L. Capacitor device 100 and resistance device 200L are joined to each other by first and second joint portions 310, 320.

Resistance device 200L has a rectangular or substantially rectangular parallelepiped shape. Resistance device 200L further includes an insulating base 210L, and a first connection electrode 221L and a second connection electrode 222L which are provided on insulating base 210L. Resistor 230L is provided on a central portion, in width direction W, of the upper surface of insulating base 210L, and has a rectangular or substantially rectangular film shape or an interconnection pattern shape as seen in plan view, for example.

First connection electrode 221L and second connection electrode 222L are isolated from each other in width direction W. First connection electrode 221L abuts one width-direction side surface of insulating base 210L and respective portions of the pair of main surfaces of insulating base 210L. Second connection electrode 222L abuts the other width-direction side surface and respective portions of the pair of main surfaces.

Resistor 230L is located, in width direction W, between first connection electrode 221L and second connection electrode 222L. One end, in width direction W, of resistor 230L covers a portion of first connection electrode 221L, while the other end thereof covers a portion of second connection electrode 222L. Accordingly, resistor 230L is directly connected, on insulating base 210L, to each of first and second connection electrodes 221L, 222L.

Insulating base 210L covers almost the whole of the upper surface of capacitor device 100. Namely, in height direction H, insulating base 210L overlaps each of at least a portion of first external electrode 121 and at least a portion of second external electrode 122. Insulating base 210L may be in contact with each of first external electrode 121 and second external electrode 122. In order to prevent resistance device 200L from being located beyond capacitor device 100 even when resistance device 200L is positionally displaced, preferably the dimension of insulating base 210L in length direction L is smaller by approximately 0.05 mm than the dimension of capacitor device 100 in length direction L and the dimension of insulating base 210L in width direction W is smaller by approximately 0.05 mm than the dimension of capacitor device 100 in width direction W, for example.

Regarding composite electronic component 600 in the present preferred embodiment, resistance device 200L is large and therefore it is easy to adsorb and support composite electronic component 600 by a mounter. Moreover, since the area of the upper surface of insulating base 210L is large, the freedom of adjustment of electrical characteristics of resistance device 200L is ensured. For example, the resistance value of resistor 230L is able to be adjusted within a wide range by trimming. In the case where resistor 230L is provided in the form of a pattern, a high degree of freedom of pattern design is obtained and the resistance value of resistor 230L is able to be adjusted within a wide range. Since insulating base 210L overlaps each of first external electrode 121 and second external electrode 122, the impact exerted on insulating base 210L when composite electronic component 600 is mounted on the circuit board is able to be dispersed to significantly reduce or prevent occurrence of cracks in insulating base 210L.

Seventh Preferred Embodiment

In the following, a description will be given of a capacitor device as well as a composite electronic component including the capacitor device according to a seventh preferred embodiment of the present invention. The composite electronic component in the seventh preferred embodiment differs from composite electronic component 300 in the first preferred embodiment mainly in terms of the fact that the resistance device is connected to the first external electrode and the second external electrode, the first internal electrode is connected to the third external electrode, and the second internal electrode is connected to the fourth external electrode in the seventh preferred embodiment. Therefore, any element similar to the corresponding element of composite electronic component 300 in the first preferred embodiment is denoted by the same reference character, and the description thereof will not be repeated.

Figure 19:
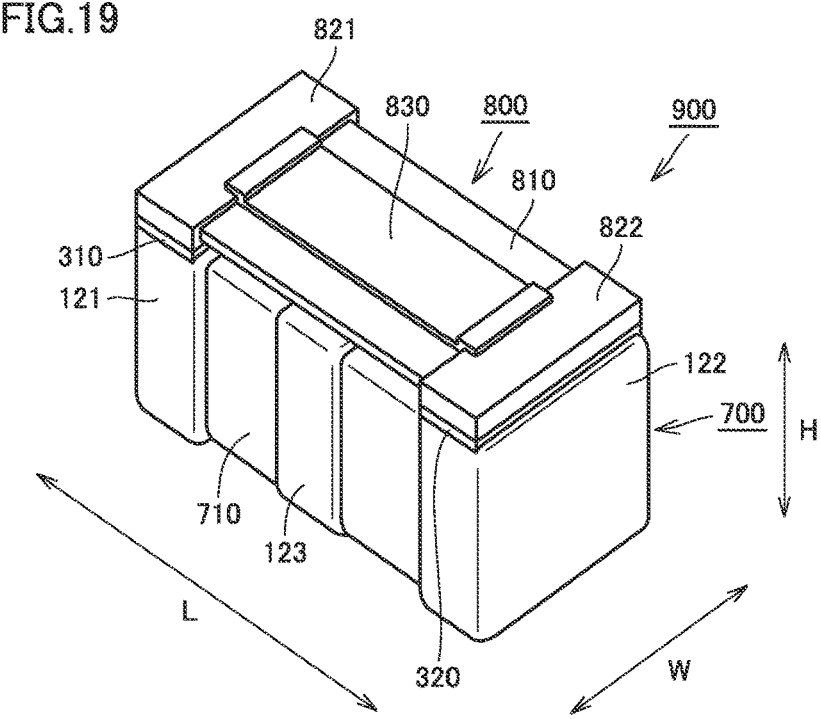
FIG. 19 is a perspective view showing an external appearance of a composite electronic component according to a seventh preferred embodiment of the present invention.
Figure 20:
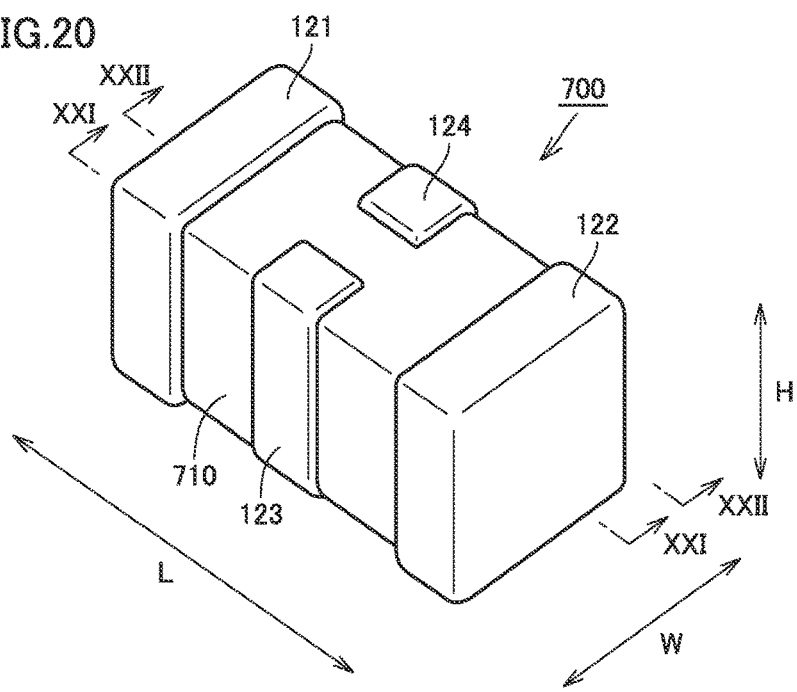
FIG. 20 is a perspective view showing an external appearance of a capacitor device according to the seventh preferred embodiment of the present invention.
Figure 21:
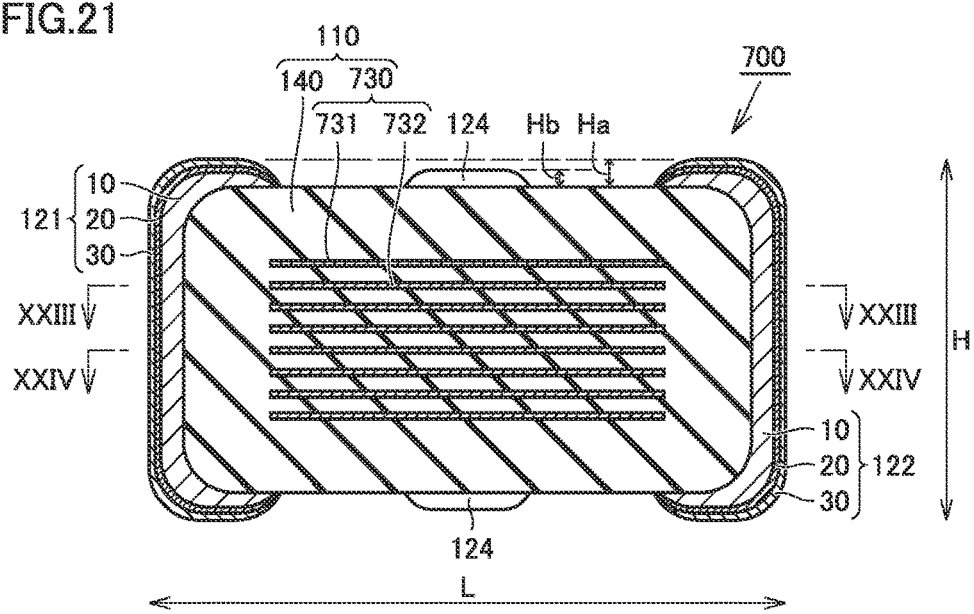
FIG. 21 is a cross-sectional view of the capacitor device according to the seventh preferred embodiment of the present invention, as seen in the direction of arrows of a line XXI-XXI in FIG. 20.
Figure 22:
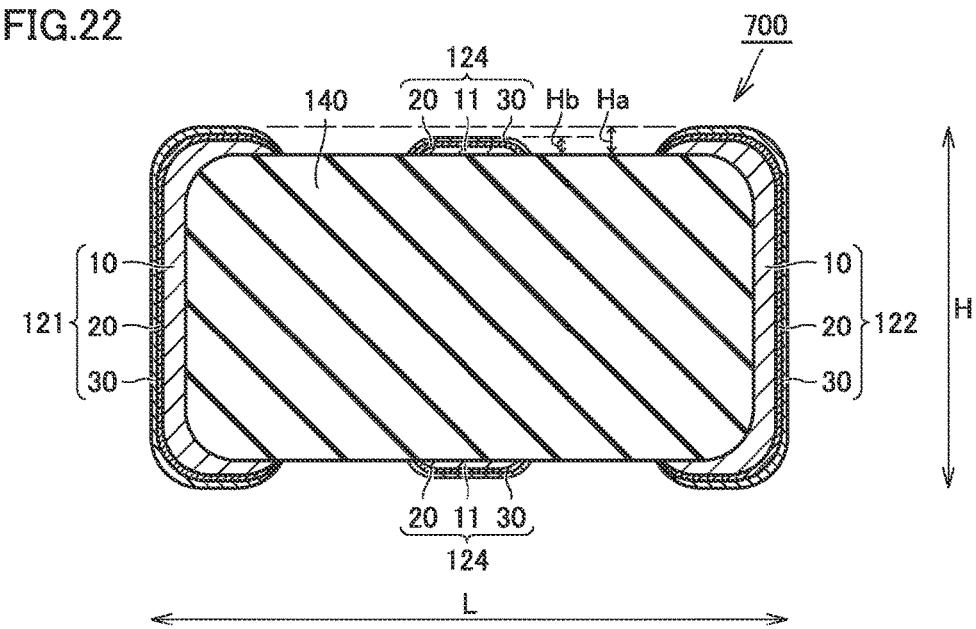
FIG. 22 is a cross-sectional view of the capacitor device according to the seventh preferred embodiment of the present invention, as seen in the direction of arrows of a line XXII-XXII in FIG. 20.

FIG. 19 is a perspective view showing an external appearance of the composite electronic component according to the seventh preferred embodiment of the present invention. FIG. 20 is a perspective view showing an external appearance of the capacitor device according to the seventh preferred embodiment of the present invention. FIG. 21 is a cross-sectional view of the capacitor device according to the seventh preferred embodiment of the present invention, as seen in the direction of arrows of a line XXI-XXI in FIG. 20. FIG. 22 is a cross-sectional view of the capacitor device according to the seventh preferred embodiment of the present invention, as seen in the direction of arrows of a line XXII-XXII in FIG. 20. FIG. 23 is a cross-sectional view of the capacitor device according to the seventh preferred embodiment of the present invention, as seen in the direction of arrows of a line XXIII-XXIII in FIG. 21. FIG. 24 is a cross-sectional view of the capacitor device according to the seventh preferred embodiment of the present invention, as seen in the direction of arrows of a line XXIV-XXIV in FIG. 21.

As shown in FIG. 19, a composite electronic component 900 in the seventh preferred embodiment of the present invention includes a capacitor device 700 and a resistance device 800 which is disposed on capacitor device 700 and includes a resistor 830.

Capacitor device 700 has a rectangular or substantially rectangular parallelepiped shape, and has the dimension in length direction L larger than the dimension in width direction W. Resistance device 800 has a rectangular or substantially rectangular parallelepiped shape, and has the dimension in length direction L larger than the dimension in width direction W.

Capacitor device 700 and resistance device 800 are joined to each other by first and second joint portions 310, 320 which are each a solder joint member or an electrically conductive joint member such as electrically conductive adhesive. The method of joining capacitor device 700 and resistance device 800 to each other is not limited to the method by the electrically conductive joint member as described above, and any of other joint methods may be used.

As shown in FIGS. 19 to 24, capacitor device 700 is a multilayer ceramic capacitor, for example, and includes a capacitor body 710, a first external electrode 121, a second external electrode 122, a third external electrode 123, and a fourth external electrode 124 which are provided on the surface of capacitor body 710.

Capacitor body 710 includes a plurality of dielectric layers 140 and a plurality of internal electrodes 730 which are alternately stacked on one another. Capacitor body 710 has a rectangular or substantially rectangular parallelepiped shape. In the present preferred embodiment, the stack direction in which a plurality of dielectric layers 140 and a plurality of internal electrodes 730 are stacked is the same as height direction H. Alternatively, the stack direction may be the same as width direction W. A plurality of internal electrodes 730 include a first internal electrode 731 and a second internal electrode 732 which face each other across dielectric layer 140.

As shown in FIGS. 23 and 24, first internal electrode 731, which is one of a pair of internal electrodes 730 adjacent to each other across dielectric layer 140 in height direction H, is directly connected, in capacitor device 700, to third external electrode 123, and second internal electrode 732 is directly connected, in capacitor device 700, to fourth external electrode 124. First internal electrode 731 and second internal electrode 732 face each other across dielectric layer 140. Thus, the region between third external electrode 123 and fourth external electrode 124 is in the state where a plurality of capacitor elements (C) are electrically connected in parallel.

In the present preferred embodiment, first external electrode 121 and second external electrode 122 are each provided in a state of being non-connected to first internal electrode 731 and second internal electrode 732 in capacitor device 700.

Figure 25:
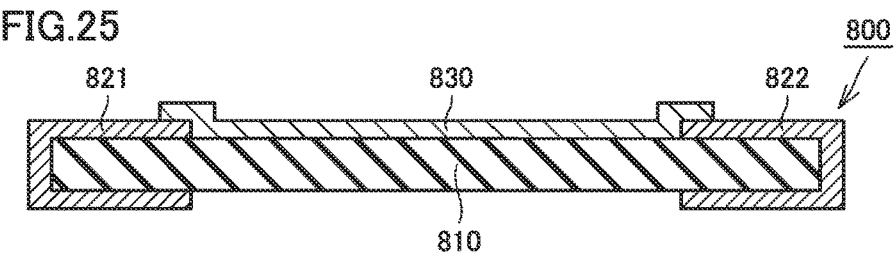
FIG. 25 is a cross-sectional view showing a configuration of a resistance device of the composite electronic component according to the seventh preferred embodiment of the present invention.

A description will now be given of resistance device 800 of composite electronic component 900. FIG. 25 is a cross-sectional view showing a configuration of the resistance device of the composite electronic component according to the seventh preferred embodiment of the present invention. In FIG. 25, a cross section corresponding to the center in width direction W and extending in length direction L is shown. As shown in FIGS. 19 and 25, resistance device 800 of composite electronic component 900 in the seventh preferred embodiment of the present invention further includes an insulating base 810, and a first connection electrode 821 and a second connection electrode 822 which are provided on insulating base 810.

As shown in FIGS. 19 and 25, resistor 830 is provided on a central portion, in width direction W, of the upper surface of insulating base 810, and has a rectangular or substantially rectangular film shape or an interconnection pattern shape as seen in plan view, for example.

First connection electrode 821 and second connection electrode 822 are isolated from each other in length direction L. First connection electrode 821 abuts one length-direction side surface of insulating base 810, and respective portions of the pair of width-direction side surfaces and the pair of main surfaces of insulating base 810. Second connection electrode 822 abuts the other length-direction side surface and respective portions of the pair of width-direction side surfaces and the pair of main surfaces.

Resistor 830 is located, in length direction L, between first connection electrode 821 and second connection electrode 822. One end, in length direction L, of resistor 830 covers a portion of first connection electrode 821, while the other end thereof covers a portion of second connection electrode 822. Accordingly, resistor 830 is directly connected, on insulating base 810, to each of first and second connection electrodes 821, 822.

As shown in FIG. 19, regarding composite electronic component 900 in the present preferred embodiment, resistance device 800 over capacitor body 710 is separated from each of third external electrode 123 and fourth external electrode 124 and disposed between first external electrode 121 and second external electrode 122. As described above, capacitor device 700 and resistance device 800 are joined to each other by first and second joint portions 310, 320.

More specifically, resistance device 800 is mounted at the upper surface side of capacitor device 700 in height direction H, and accordingly, the lower surface of insulating base 810 and the upper surface of capacitor body 710 face each other in height direction H, first external electrode 121 of capacitor device 700 and first connection electrode 821 of resistance device 800 are joined together by first joint portion 310, and second external electrode 122 of capacitor device 700 and second connection electrode 822 of resistance device 800 are joined together by second joint portion 320.

In this way, first connection electrode 821 is electrically connected by first joint portion 310 to first external electrode 121. Second connection electrode 822 is electrically connected by second joint portion 320 to second external electrode 122.

Resistor 830 provided as a portion of resistance device 800 is electrically connected to first and second connection electrodes 821, 822 of resistance device 800 as described above. Therefore, resistor 830 is electrically connected to each of first and second external electrodes 121, 122 which are electrically connected to first and second connection electrodes 821, 822, respectively.

Figure 26:
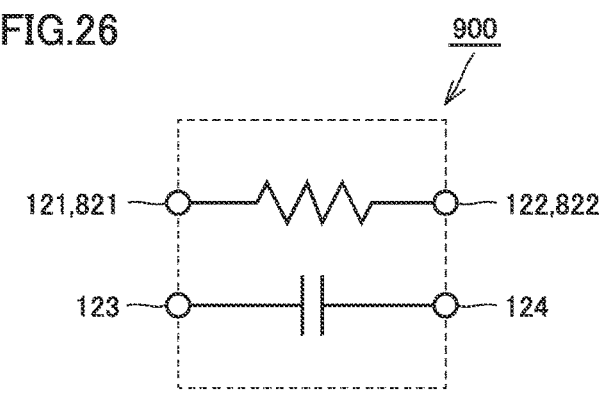
FIG. 26 is a diagram showing an equivalent circuit of the composite electronic component according to the seventh preferred embodiment of the present invention.

FIG. 26 is a diagram showing an equivalent circuit of the composite electronic component according to the seventh preferred embodiment of the present invention. As shown in FIG. 26, the circuit of composite electronic component 900 in the present preferred embodiment does not have a closed loop electrically connecting a resistance element (R) and a capacitor element (C) in parallel in composite electronic component 900, and therefore has a high degree of design freedom, in terms of circuit design. Namely, by a circuit board on which this composite electronic component 300 is mounted, the resistance element (R) and the capacitor element (C) are electrically connected and thus these elements can be connected either in series or parallel. In some cases, these elements are also able to be connected to respective circuits different from each other. Thus, a composite electronic component applicable to a variety of circuits is able to be implemented.

In addition, composite electronic component 900 configured in the above-described manner reduces the mount area where the component is mounted (increasing the degree of integration of electronic components on a circuit board), through the integration of capacitor device 700 and resistance device 800 into the composite component.

Here, for the sake of reduction of the mount area, preferably the dimension of capacitor device 700 in length direction L is larger than the dimension of resistance device 800 in length direction L, and preferably the dimension of capacitor device 700 in width direction W is larger than the dimension of resistance device 800 in width direction W. For the sake of mount stability of composite electronic component 900, preferably the dimension of capacitor device 700 in height direction H is larger than the dimension of resistance device 800 in height direction H.

As seen from the foregoing, regarding composite electronic component 900 and capacitor device 700 thereof in the present preferred embodiment, a resistance element (R) and a capacitor element (C) each having desired electrical characteristics are able to be combined easily. Accordingly, not only an increase of the degree of design freedom of the composite electronic component itself, but also an increase of the degree of design freedom for the circuit design of a circuit board on which the composite electronic component is mounted are able to be achieved.

Here, multiple types of devices which are different in electrical characteristics may be prepared as capacitor device 700 to be a portion of the composite component, and multiple types of devices which are different in electrical characteristics may also be prepared as resistance device 800 to be a portion of the composite component. Then, any of these devices may be selected and combined as appropriate to thus enable easy manufacture of a composite electronic component having both a resistance element (R) and a capacitor element (C) each having desired electrical characteristics.

In the above-described preferred embodiment, first and second connection electrodes 821, 822 to which resistor 830 is connected are separated from each other in length direction L in which first external electrode 121 and second external electrode 122 of capacitor device 700 are arranged. In this way, the distance between first connection electrode 821 and second connection electrode 822 is able to be increased and the area where resistor 830 is formed on the upper surface of insulating base 810 is able to be increased. Thus, both the ensured electrical insulation between first and second connection electrodes 821, 822 and the ensured freedom of adjustment of electrical characteristics of resistor 830 are able to be achieved. Moreover, the stability of the posture when resistance device 800 is mounted over capacitor device 700 is able to be improved.

In the above-described preferred embodiment, insulating base 810 overlaps each of at least a portion of third external electrode 123 and at least a portion of fourth external electrode 124, in height direction H. Thus, the impact exerted on insulating base 810 when composite electronic component 900 is mounted on the circuit board is able to be dispersed to significantly reduce or prevent the occurrence of cracks in insulating base 810.

Among the features of the composite electronic components in the first to seventh preferred embodiments as described above, any features which can be combined may be combined as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A composite electronic component comprising:
   a capacitor device; and
   a resistance device disposed on the capacitor device and including a resistor; wherein
   the capacitor device includes:
      a capacitor body including a first internal electrode and a second internal electrode facing each other across a dielectric layer; and
      a first external electrode, a second external electrode, a third external electrode, and a fourth external electrode each provided on a surface of the capacitor body;
   the first external electrode and the second external electrode are isolated from each other in a length direction perpendicular or substantially perpendicular to a height direction of the capacitor body;
   the third external electrode and the fourth external electrode are isolated from each other and located between the first external electrode and the second external electrode in the length direction;
   the first external electrode is directly connected to the first internal electrode or the second internal electrode;
   the second external electrode is directly connected to the first internal electrode or the second internal electrode;
   the resistor is electrically connected to each of the third external electrode and the fourth external electrode; and
   the third external electrode and the fourth external electrode are not connected to the first internal electrode and the second internal electrode in the capacitor device.

2. The composite electronic component according to claim 1, wherein
   the resistance device includes an insulating base, and a first connection electrode and a second connection electrode which are provided on the insulating base;
   the resistor is directly connected, on the insulating base, to each of the first connection electrode and the second connection electrode;
   the first connection electrode is electrically connected to the third external electrode; and
   the second connection electrode is electrically connected to the fourth external electrode.

3. The composite electronic component according to claim 2, wherein in the height direction of the capacitor body, the insulating base overlaps each of at least a portion of the first external electrode and at least a portion of the second external electrode.

4. The composite electronic component according to claim 1, wherein
   the resistance device is defined by the resistor which is directly provided on the capacitor device; and
   the resistor is directly connected to each of the third external electrode and the fourth external electrode.

5. The composite electronic component according to claim 1, wherein
   the capacitor body further includes a first internal conductor and a second internal conductor which are provided outside a region where the first internal electrode and the second internal electrode face each other as seen in a stack direction in which the first internal electrode and the second internal electrode are stacked, and which are isolated from each other;
   the first internal conductor is directly connected to the third external electrode; and
   the second internal conductor is directly connected to the fourth external electrode.

6. The composite electronic component according to claim 1, wherein
   the capacitor body includes a third internal electrode facing at least one of the first internal electrode and the second internal electrode; and
   the third internal electrode is directly connected to the third external electrode or the fourth external electrode.

7. The composite electronic component according to claim 1, wherein in the height direction of the capacitor body, a maximum thickness of each of the third external electrode and the fourth external electrode is smaller than a maximum thickness of each of the first external electrode and the second external electrode.

8. A composite electronic component comprising:
   a capacitor device; and
   a resistance device disposed on the capacitor device and including a resistor; wherein
   the capacitor device includes:
      a capacitor body including a first internal electrode and a second internal electrode facing each other across a dielectric layer; and
      a first external electrode, a second external electrode, a third external electrode, and a fourth external electrode each provided on a surface of the capacitor body;
   the first external electrode and the second external electrode are isolated from each other in a length direction perpendicular or substantially perpendicular to a height direction of the capacitor body;
   the third external electrode and the fourth external electrode are isolated from each other and located between the first external electrode and the second external electrode in the length direction;

the third external electrode is directly connected to the first internal electrode or the second internal electrode;

the fourth external electrode is directly connected to the first internal electrode or the second internal electrode;

the resistor is electrically connected to each of the first external electrode and the second external electrode; and the first external electrode and the second external electrode are each not connected to the first internal electrode and the second internal electrode in the capacitor device.

9. The composite electronic component according to claim 8, wherein the resistance device includes an insulating base, and a first connection electrode and a second connection electrode which are provided on the insulating base;

the resistor is directly connected, on the insulating base, to each of the first connection electrode and the second connection electrode;

the first connection electrode is electrically connected to the first external electrode; and the second connection electrode is electrically connected to the second external electrode.

10. The composite electronic component according to claim 9, wherein in the height direction of the capacitor body, the insulating base overlaps each of at least a portion of the third external electrode and at least a portion of the fourth external electrode.

* * * * *